Patented Feb. 5, 1952

2,584,341

UNITED STATES PATENT OFFICE 2,584,341

PROCESS OF REACTING AN ORGANOSILANE, GLYCERINE, AND GLYCERINE-DICARBOXYLIC ACID ESTER

John T. Goodwin, Jr., and Melvin J. Hunter, Midland, Mich., assignors to Dow Corning Corporation, Midland, Mich., a corporation of Michigan No Drawing. Application January 7, 1950, Serial No. 137,472

3 Claims. (Cl. 260—45.4)

This invention relates to resinous thermosetting compositions of matter.

The copending application of Melvin J. Hunter et al., Serial No. 59,414, filed November 10, 1948, discloses and claims resin compositions prepared by reacting a silane with a polyhydric alcohol and thereafter reacting the product with a polybasic acid. Resins prepared in this manner are of great utility as coating compositions, such as paint vehicles and wire enamels. However, only a limited range of compositions can be prepared by this method, due to incompatibility.

It is an object of this invention to prepare resinous materials which possess physical properties not obtainable by any previously known method. Another object is to prepare resinous materials which combine heat stability, toughness, and solvent-resistance to a degree heretofore unknown.

In accordance with this invention a silane is reacted with glycerine, and the resulting silane-glycerine ester is reacted with an acid ester formed by reacting glycerine and an acidic compound of the group dicarboxylic acids and anhydrides thereof in amount such that the molar ratio of acidic compound to glycerine is from 1.33 to 2.

The silanes of this invention have the formula $R_nSiX_{4-n}$, where R is a monovalent hydrocarbon radical, X is alkoxy, acyloxy, or chlorine, and n has a value from 0.9 to 2.1. Such silanes are well known in the art.

The silane is reacted with glycerine in amount such that the ratio of silane X radicals to OH is from 0.25 to 0.9. The reaction is brought about by mixing the silane and the glycerine, whereupon reaction begins at once with the formation of a silane-glycerine ester and the elimination of an alcohol or HCl. The reaction may be carried out at temperatures ranging from below 30° C. up to 250° C. In general, with chlorosilanes the reaction proceeds smoothly at room temperature. When the silane X is alkoxy, it is preferred that the reaction be carried out at temperatures between 100° C. and 200° C. In either case the reaction is continued until substantially the theoretical amount of by-product has been removed.

For the purpose of this invention any alkoxy radical, such as for example, methoxy, ethoxy, butoxy and stearyloxy, may be present on the silicon.

The basic reaction involved in the preparation of the silane-glycerine ester may be represented schematically as follows:

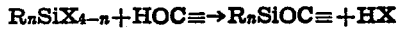

Whereas resinous materials are obtained when the silane contains any acyloxy group, for the purpose of this invention it is preferred that the acyloxy radical be one which contains at least seven carbon atoms. The primary purpose of employing silanes containing acyloxy groups is to obtain modification of the resinous product. Such a modification is obtained primarily with the higher acyloxy groups containing at least seven carbon atoms. Examples of the preferred radicals which produce the desired modification, such as improved solubility in hydrocarbon solvents, are stearyloxy, 2-ethyl hexoyloxy, benzoyloxy, and linoleyloxy. Thus, it can be seen that the hydrocarbon portion of the acyloxy group may be either monocyclic aryl, saturated aliphatic or unsaturated aliphatic.

Acyloxy silanes may be prepared by reacting carboxylic acids with alkoxy silanes or by reacting salts of carboxylic acids with chlorosilanes. In the former case an alcohol is the by-product, while in the latter the halogen salt is split out.

The silanes employed in the method of this invention have from 0.9 to 2.1 monovalent hydrocarbon radicals per silicon atom. It has been found that satisfactory coating compositions are obtained when the radicals are saturated aliphatic hydrocarbon radicals containing less than seven carbon atoms, such as methyl, ethyl, propyl, butyl, cyclohexyl, and cyclopentyl, and monocyclic aryl radicals such as phenyl, tolyl, chlorophenyl, and xylyl are employed. It is to be understood that any combination of the above-defined groups may be present in the silane and that the silane may be a mixture of $SiX_4$, $RSiX_3$, $R_2SiX_2$ and $R_3SiX$, so proportioned as to give the above-defined degree of substitution.

The acid esters employed herein are formed by reacting glycerine and a dicarboxylic acid or anhydride thereof in amount such that the molar ratio of acidic compound to glycerine is from 1.33 to 2. Usually heating at a temperature from 140° C. to 150° C. for about one hour is sufficient. Thus, in the acid esters there is always an excess of carboxyl groups to react with the silane-glycerine ester.

Theoretically, the acid esters have an average degree of polymerization of 2 and would respond to the formula

when the molar ratio of acid to glycerine is 2 and a mixture of the above and

when the molar ratio is between 1.33 and 2. These esters are completely soluble in polar organic solvents such as alcohols and are not resinous in character.

The acidic compounds employed to make the acids esters are dicarboxylic acids and anhydrides thereof. Any acid having the formula HOOCRCOOH or its anhydride, in which R is a divalent aryl or divalent aliphatic radical, produces satisfactory resinous materials when employed in the method of this invention. Examples of such acids are phthalic, malonic, maleic, and fumaric.

The silane-glycerine ester is reacted with the acid ester in amount such that the ratio of the total glycerine OH to the total dicarboxylic acid carboxyl groups is from 1.25:1 to 2.8:1. The reaction is carried out by heating a mixture of the two esters, preferably at a temperature between 100° C. and 250° C. Under these conditions the acid ester reacts with the silane-glycerine ester by means of a condensation reaction between the glycerine hydroxyls and the carboxyl groups of the acid ester.

The reaction of the two esters is continued until the desired state of polymerization is obtained. It has been found convenient to stop the reaction when the product shows a tendency to string or wrap around the agitator. In such a state the product is still soluble in solvents such as cyclohexanol, ketones, and aromatic hydrocarbons. Thus the material may be readily applied as a solution to the surfaces of a base member.

If heating of the resins is continued, a thermoset, insoluble, infusible material is obtained.

Normally the above process is carried out in the absence of any solvent. However, if desired, solvents such as aromatic hydrocarbons, alcohols, or ketones may be employed.

When the materials obtained by the above method are placed upon metal surfaces and heated at temperatures of 100° to 250° C., a firmly adhering, hard, flexible, solvent-resistant coating is obtained. These coatings possess a combination of thermal stability, stress-strain properties, and resistance to solvents which are not shown by resins heretofore known. The thermal stability approaches that of siloxane resins, while the high melting point and resistance to solvents at elevated temperature are essentially as good as thermosetting organic resins such as alkyds. Such a combination of properties makes the resins prepared by the method of this invention eminently suitable for high-temperature magnet wire enamel and high-temperature paint vehicles.

The thermal stability of the instant materials is such that they may be heated at temperatures up to 250° C. for prolonged periods of time without appreciable deterioration.

The following examples are illustrative only.

*Example 1*

A mixture of 189 grams of phenylmethyldiethoxysilane and 24 grams of phenyltriethoxysilane was added to 96 grams of anhydrous glycerine, and the mixture was heated at a temperature of about 170° C. until substantially the theoretical amount of alcohol was removed.

415 grams of phthalic anhydride was reacted with 140 grams of anhydrous glycerine at a temperature of about 100° C. The reaction was continued until a homogeneous product was obtained. The resulting acid ester was then reacted with the silane-glycerine ester shown above by mixing the two and heating at a temperature up to 210° C. Water was evolved. The reaction was continued until the product began to wrap around the stirrer, whereupon the mass was dissolved in 600 grams of cyclohexanol.

The cyclohexanol solution was applied to the surface of tin and baked one hour at 200° C. A tough, flexible, solvent-resistant coat was obtained.

*Example 2*

420 grams of phenylmethyldiethoxysilane was reacted with 184 grams of glycerine at a temperature of 200° C. in the presence of a trace of HCl as a catalyst. Heating was continued until substantially the theoretical amount of alcohol was removed. The silane-glycerine ester was then reacted with an acid ester which had been prepared by heating a mixture of 518 grams of phthalic anhydride with 184 grams of glycerine at 150° C.

The acid ester and the glycerine ester were mixed and heated at a temperature of 190° C. to 230° C. until the product began to wrap around the stirrer. The material was then dissolved in cyclohexanone.

No. 24 copper wire was coated with the solution and baked in a tower at 350° C. to 400° C. for about one minute. The resulting film did not crack when the wire was bent around a mandrel of the same diameter as the wire. When the wire was broken with a quick jerk, the resin did not pull away from the surface of the metal. The film had a scrape hardness of 14 at 30° C. and an elongation of 30 per cent at break. The softening point was 147° C.

*Example 3*

A mixture of 96 grams of phenyltriethoxysilane, 87 grams of 2-ethylhexoic acid, and 37 grams of glycerine was heated at 170° C. until substantially the theoretical amount of ethyl alcohol was removed. The resulting modified silane-glycerine ester was then reacted with an acid ester prepared from 55 grams of glycerol and 178 grams of phthalic anhydride. The latter were reacted at 170° C.

The glycerine-silane ester and the acid ester were mixed and heated at 190° C. to 230° C. until the product began to wrap around the stirrer. The mass was then dissolved in cyclohexanol, and a can lid was coated with the solution and heated one hour at 200° C. A hard, brittle film was obtained.

*Example 4*

A resin was prepared in the manner of Example 1 by reacting a mixture of 189 grams of phenylmethyldiethoxysilane, 24 grams of phenyltriethoxysilane, and 96 grams of glycerine and thereafter reacting the product with an ester composed of 415 grams of a phthalic anhydride and 140 grams of glycerine.

No. 24 copper wire was coated with a cyclohexanol solution of the resin and then heated at about 400° C. for one minute. The resulting film had a scrape hardness of 11 at 30° C., an elongation of 13 per cent at break, and a softening point of 150° C.

*Example 5*

A resinous material was prepared in accordance with Example 1 by reacting 420 grams of phenylmethyldiethoxysilane with 184 grams of glycerine and thereafter reacting the product with the reaction product of 596 grams of phthalic anhydride and 184 grams of glycerine.

This material set to a tack-free flexible coat when baked one hour at 200° C. on a metal panel.

Example 6

105 grams of phenylmethyldiethoxysilane and 43 grams of 2-ethylhexoic acid were mixed and heated at 170° C. until the theoretical amount of ethanol distilled. The product was an ethoxy hexoyloxy phenylmethylsilane.

The silane was reacted with 46 grams of glycerine and then with a glyceryl phthalate containing 46 grams of glycerine and 148 grams of phthalic acid, in the manner shown in Example 1. The resulting resin produced satisfactory coatings when baked on a metal panel at 200° C. for two hours.

Example 7

Satisfactory coating resins are obtained when 1 gram mol of phenylmethyldiethoxysilane is reacted with 2 gram mols of benzoic acid at 170° C. until 2 gram mols of ethanol are removed, and thereafter reacting the phenylmethyldibenzoyloxysilane with glycerine and the glyceryl phthalate in the amounts and by the procedure of Example 6.

Example 8

A thermosetting resin is obtained when a mixture of 1.8 gram mols of phenylmethyldichlorosilane and .2 gram mols of methyltrichlorosilane is added to 6.6 gram mols of U. S. P. glycerine and the mixture maintained at 30° C. until about the theoretical amount of HCl evolves and thereafter reacting the silane-glycerine ester with an acid ester prepared by reacting 4.8 gram mols of phthalic anhydride with 2.4 gram mols of glycerine at 150° C., said reaction being carried out by the method of Example 1.

Example 9

184 grams of glycerine was reacted with 148 grams of phthalic anhydride by heating a mixture of the two at 140° C. to 150° C. for thirty minutes. The resulting ester was reacted with 238 grams of phenylmethyldi-isopropoxysilane by heating the mixture at 170° C. to 200° C. until substantially the calculated amount of isopropanol was removed.

The silane-glycerine ester so formed was then reacted with an acid ester prepared by reacting 184 grams of glycerine and 592 grams of phthalic anhydride in the usual manner. The silane-glycerine ester and the acid ester were mixed and heated at 170° C. to 210° C. until the mixture began to wrap around the stirrer. The product was then dissolved in cyclohexanol.

A solution of the resin was applied to a tin surface and baked one hour at 200° C. A tack-free, tough, flexible coat was obtained.

That which is claimed is:

1. The method of preparing thermosetting resinous materials which comprises reacting a silane of the formula $R_nSiX_{4-n}$, where R is a monovalent hydrocarbon radical selected from the group consisting of saturated aliphatic radicals of less than seven carbon atoms and monocyclic aryl radicals, X is selected from the group consisting of alkoxy, acyloxy and chlorine, said acyloxy radicals being of the formula RCOO—, where R is a hydrocarbon radical, and $n$ has a value from 0.9 to 2.1, with glycerine in amount such that the ratio of silane X radicals to glycerine OH is from 0.25:1 to 0.9:1 and then reacting the silane-glycerine ester so obtained with an alcohol-soluble acid ester formed by reacting glycerine with an acidic compound selected from the group consisting of dicarboxylic acids and anhydrides thereof, the glycerine and acidic compound being reacted in amount such that the molar ratio of acidic compound to glycerine is from 1.33:1 to 2:1, said silane-glycerine ester and said acid ester being reacted in amount such that the ratio of total glycerine OH to the total dicarboxylic acid carboxyl groups is from 1.25:1 to 2.8:1.

2. The method in accordance with claim 1 wherein the silane is a mixture of phenylmethyldialkoxysilane and a phenyltrialkoxysilane.

3. The method in accordance with claim 1 wherein the silane is phenylmethyldichlorosilane.

JOHN T. GOODWIN, Jr.
MELVIN J. HUNTER.

REFERENCES CITED

The following references are of record in the file of this patent:

UNITED STATES PATENTS

| Number | Name | Date |
|---|---|---|
| 2,395,550 | Iler et al. | Feb. 26, 1946 |
| 2,426,121 | Rust et al. | Aug. 19, 1947 |
| 2,441,066 | Hanford | May 4, 1948 |
| 2,529,956 | Myles et al. | Nov. 14, 1950 |

FOREIGN PATENTS

| Number | Country | Date |
|---|---|---|
| 583,754 | Great Britain | Dec. 30, 1946 |